March 3, 1931.   O. S. CAESAR   1,795,106
VEHICLE BODY
Filed May 28, 1928   3 Sheets-Sheet 3

Inventor
ORVILLE S. CAESAR
By Paul, Paul + Moore
ATTORNEYS

Patented Mar. 3, 1931

1,795,106

UNITED STATES PATENT OFFICE

ORVILLE S. CAESAR, OF CHICAGO, ILLINOIS, ASSIGNOR TO TROPIC-AIRE, INCORPORATED, OF MINNEAPOLIS, MINNESOTA, A CORPORATION OF DELAWARE

VEHICLE BODY

Application filed May 28, 1928. Serial No. 281,263.

This invention relates to new and useful improvements in vehicle bodies, particularly bus bodies, adapted for passenger service.

An object of the invention is to construct the interior of the forward end of the body in such a manner as to materially increase the passenger-carrying capacity of the vehicle without increasing the over all length of the bus.
A further object of the invention is to provide a vehicle body having a wall separating the interior of the vehicle body from the engine chamber which is off-set forwardly at one side of the engine to provide additional room within the body at the forward end thereof, whereby the driver's seat may be relatively moved forwardly within the vehicle body, and nearer to the engine than is possible in busses now in common use, thereby increasing the floor space of the vehicle with the resultant increase in the "pay load" or passenger-carrying capacity of the vehicle, the foot-board forwardly of the driver's seat also being stepped to provide ample foot and leg room for the driver.

A further object is to construct the forward interior portion of the vehicle body in such a manner that the driver's seat may be relatively moved forwardly without crowding the driver, the foot board being provided with a plurality of steps arranged substantially parallel to the median line of the vehicle body to provide ample leg room for the driver.
Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1:
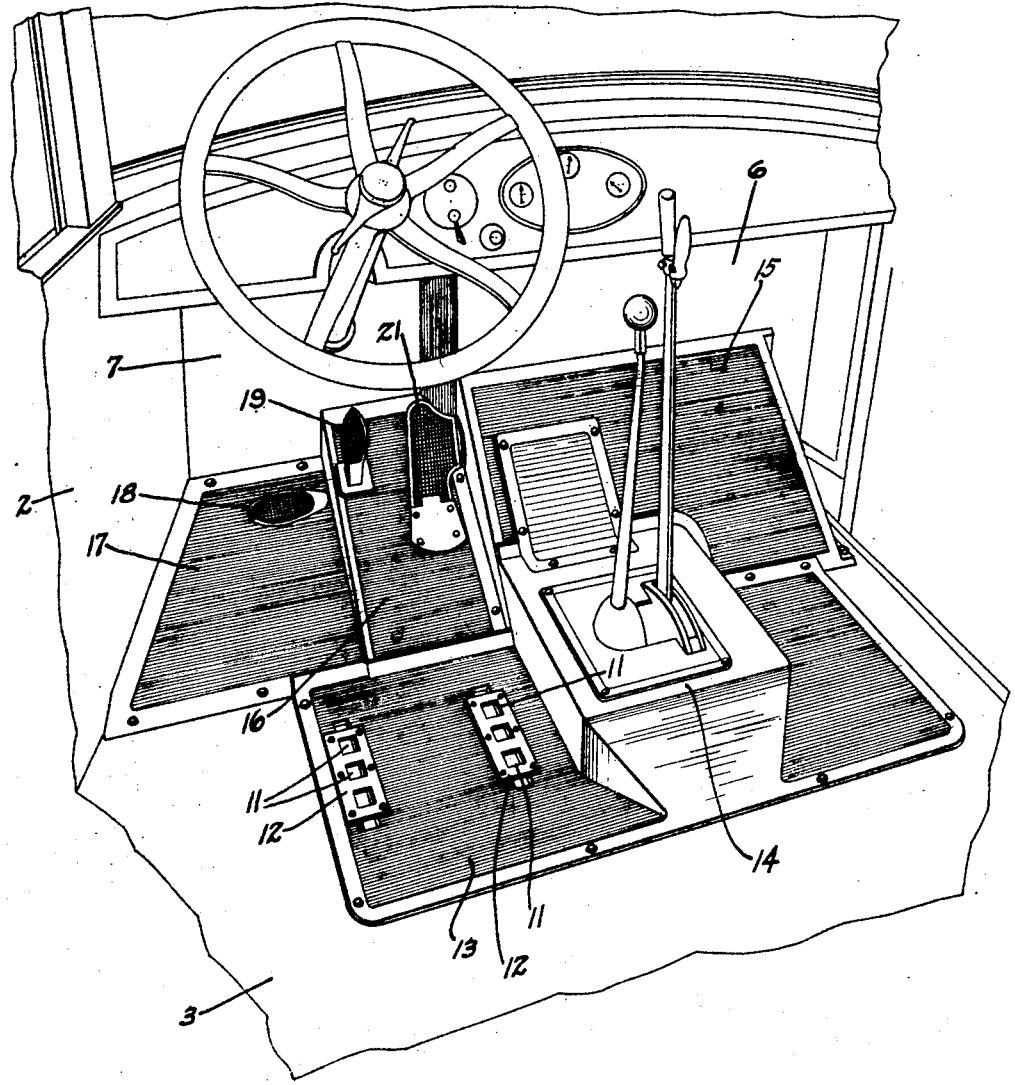
Figure 1 is a perspective view illustrating a portion of the interior of the forward end of the vehicle, showing the invention applied thereto.

In the selected embodiment of the invention here shown, for purposes of disclosure, there is illustrated the forward portion of a vehicle body 2, having the usual floor 3 and an engine chamber 4 provided at the forward end thereof, wherein the engine 5 is mounted.

Figure 2:
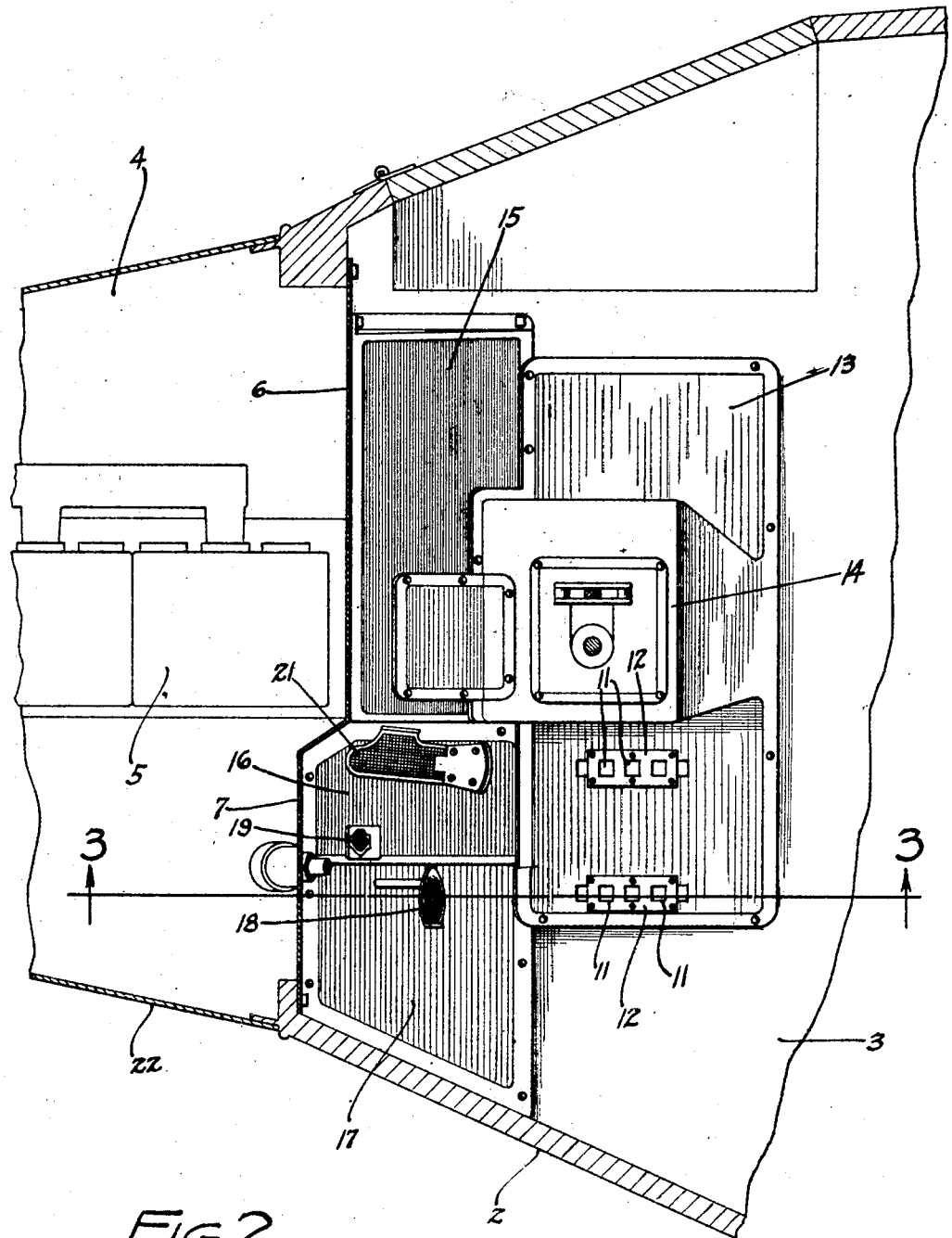
Figure 2 is a plan view of Figure 1.
Figure 3:
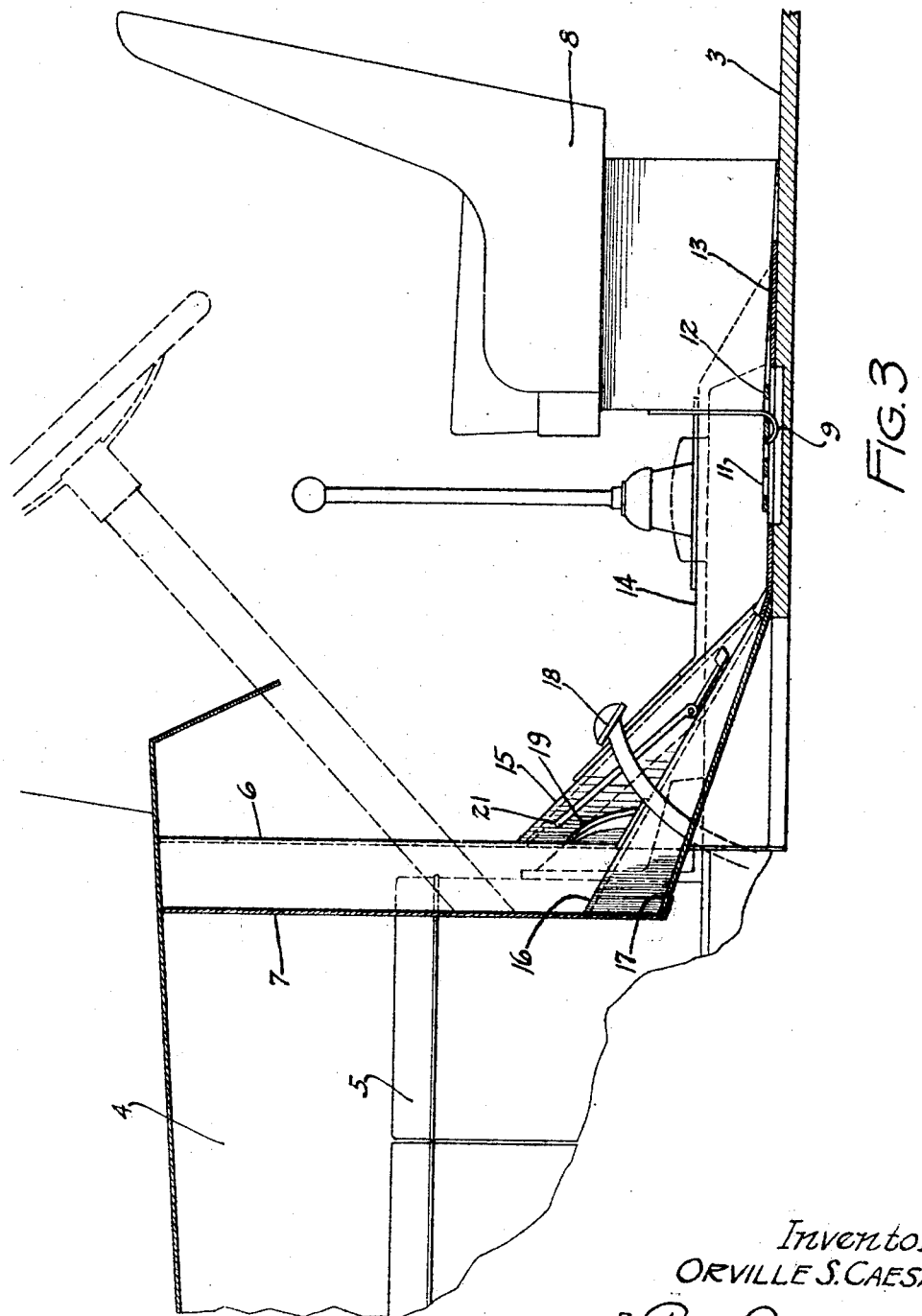
Figure 3 is a sectional elevation on the line 3—3 of Figure 2.

A feature of this invention resides in the construction of the partition or wall 6, separating the interior of the vehicle body from the engine chamber 4. As shown in Figure 2, the wall 6 has an off-set portion 7, extending forwardly at one side of the engine 5, thus increasing the space within the vehicle body to the extent that the driver's seat 8 may be moved forwardly upon the floor 3. In the drawings, I have shown the seat 8 adjustably secured to the floor by means of hook members 9 adapted to be received in apertures 11, provided in plates 12 secured to the floor plate 13, as shown in Figures 1 and 2.

In the construction of buses, such as are commonly used for passenger service, it is of utmost importance to utilize all available space within the body to increase the "payload" or passenger-carrying capacity of the vehicle to the maximum. To thus increase the passenger-carrying capacity of the vehicle body without increasing the over all length of the vehicle, I have located the driver's seat 8 at one side of the transmission housing 14 as shown in Figures 1 and 2, and to permit moving the seat forwardly, and, at the same time, providing ample foot room for the driver, the foot board connecting the wall 6 with the floor 3 of the vehicle, is composed of sections or panels 15—16, and 17, each arranged at a different angle with respect to the others.

It will be noted that the section 15 is located directly above the rear portion of the engine transmission case. The intermediate section 16 is arranged at a less angle with respect to the floor 3, which angle is determined by the clearance required between the bottom of the section 16 and that portion of the engine transmission located therebeneath. The section 17 is arranged at a very slight angle with respect to the floor 3, because of no obstructions therebeneath. Located in this latter section 17 is the usual clutch pedal 18, and in the intermediate section 16 may be located the throttle 21 and air brake pedal 19, now commonly used on modern buses.

By thus constructing the foot board of a plurality of sections arranged at different angles and off-setting a portion of the wall 6, it will be noted, by reference to Figure 2, that the left hand side of the foot board and also the left hand side of the wall separating the engine chamber from the interior of the vehicle body, will extend forwardly into the space between the engine 5 and the wall 22 of the engine chamber 4, thus utilizing a portion of the space between the engine and the wall 22 with the result that the driver's seat may be moved forwardly to increase the floor space within the vehicle. Thus, it will be seen that the passenger-carrying capacity of the vehicle may be increased without increasing the over-all length of the bus.

I claim as my invention:

1. A motor vehicle comprising a body having a floor, an engine chamber at one end thereof, an engine in said chamber, a wall disposed rearwardly of the engine block in close proximity thereto separating the engine chamber from the interior of the body and having an off-set portion located forwardly of the rear end of said engine block at a side thereof, and a foot board between said wall and the vehicle floor and having a plurality of steps therein.

2. A motor vehicle comprising a body having a floor, an engine chamber at one end thereof, an engine in said chamber, a wall disposed rearwardly of the engine block in close proximity thereto separating the engine chamber from the interior of the body and having an off-set portion located forwardly of the rear end of said engine block at a side thereof, and an inclined foot board between said wall and the vehicle floor and having a plurality of steps therein arranged substantially parallel to the median line of the vehicle body.

3. A motor vehicle comprising a body having a floor, an engine chamber at one end thereof, an engine in said chamber, a wall disposed rearwardly of the engine block in closed proximity thereto seperating the engine chamber from the interior of the body and having an off-set portion located forwardly of the rear end of said engine block at a side thereof, and an inclined foot board between said off-set portion and the vehicle floor and having a plurality of steps each with its length disposed longitudinally of the vehicle body, said steps being arranged at different angles with respect to each other.

4. A motor vehicle comprising a body having a floor, an engine chamber at one end thereof, an engine in said chamber, a wall disposed rearwardly of the engine block in close proximity thereto separating the engine chamber from the interior of the body and having an off-set portion located forwardly of the rear end of said engine block at a side thereof, and a foot board between said wall and the vehicle floor and having a plurality of steps therein, including a step located above the rear portion of the engine transmission case, a step situated at a side of the step mentioned and arranged at smaller angle with respect to the floor, which angle is determined by the clearance required between the bottom of the last mentioned step and a portion of the engine transmission located therebeneath, and a step situated at a side of said last mentioned step and arranged at a still smaller angle with respect to the floor.

In witness whereof, I have hereunto set my hand this 21st day of May, 1928.

ORVILLE S. CAESAR.